United States Patent [19]

Turner

[11] Patent Number: 4,748,744
[45] Date of Patent: Jun. 7, 1988

[54] NIBBLING TOOL

[75] Inventor: Kenneth J. Turner, Croydon, England

[73] Assignee: Turner Precision Engineering, Croydon, England

[21] Appl. No.: 875,049

[22] Filed: Jun. 17, 1986

[30] Foreign Application Priority Data

Jul. 2, 1985 [GB] United Kingdom ............... 8516711
Mar. 3, 1986 [GB] United Kingdom ............... 8605218

[51] Int. Cl.⁴ .......................... B26F 1/02; B23D 27/02
[52] U.S. Cl. ........................................ 30/241; 30/228; 83/694
[58] Field of Search ............... 30/241, 242, 243, 228; 83/693, 694, 916

[56] References Cited

U.S. PATENT DOCUMENTS

| 2,211,044 | 8/1940 | Ashton | 83/916 X |
| 2,632,950 | 3/1953 | Hedstrom | 30/241 |
| 3,235,963 | 2/1966 | Hall | 30/241 X |
| 3,785,052 | 1/1974 | Yermis | 30/241 |
| 4,158,913 | 6/1979 | Batson | 30/241 |
| 4,312,256 | 1/1982 | Herzog | 30/241 X |

FOREIGN PATENT DOCUMENTS

| 514126 | 10/1939 | United Kingdom . |
| 636983 | 5/1950 | United Kingdom . |
| 672857 | 5/1952 | United Kingdom . |
| 856176 | 12/1960 | United Kingdom . |
| 1000213 | 8/1965 | United Kingdom . |
| 1485795 | 9/1977 | United Kingdom . |
| 2099744 | 8/1984 | United Kingdom . |

Primary Examiner—E. R. Kazenske
Assistant Examiner—Michael D. Folkerts
Attorney, Agent, or Firm—Blum Kaplan

[57] ABSTRACT

The invention concerns a nibbling tool for cutting sheet material having a body (12) in which a rotary shaft (14) is mounted for rotation by an external drive. The rotary shaft is coupled to a punch (33) such that the rotary movement is converted to a reciprocal movement of the punch. The punch is guided in a die (27) with the punch and die having co-operating cutting edges. The die (27) has a circular sectioned shank (28) located as a good sliding fit in the body (12) and retained by a screw (30) projecting into a recess (29) in the shank (28). When the screw (30) is released the die can be rotated to change the cutting direction or removed and replaced without opening up the body or taking out other parts. With the die removed the punch can be removed easily. The punch is guided both at its upper end in a bore (25) in handle (23) and at its lower end by its head (38) located in a bore in a lower die portion (53) connected to the main die portion (28) by a web (55). The corners (55A) connecting the web with the main die portion and/or lower die portion are radiused or chamfered.

13 Claims, 6 Drawing Sheets

NIBBLING TOOL

BACKGROUND OF THE INVENTION

This invention relates to a nibbling tool for shearing sheet material and more particularly to a hand held tool which may have its own complete drive or have a drive means comprising a rotary drive shaft designed to be coupled to an external drive means, for example the chuck of a conventional electric drill.

Nibbling tools for shearing a channel in sheet material by relative movement between the tool and material in a direction along the channel are known, for example from U.K. Specification Nos. 636983, 1485795 and 2099744, comprising a body, a punch, drive means for reciprocating the punch and a die defining a channel for guiding the punch for reciprocating movement, the punch and die having co-operating curved cutting edges extending transversely to the channel to be cut such that each reciprocating movement of the punch removes a crescent shaped chip of material so as to extend the channel. Normally a drive shaft is mounted in the body for rotation about its axis and coupling means couple the punch and drive shaft to convert the rotational movement to linear reciprocation of the punch.

Preferably the die has a lower guide portion in which the lower end of the punch is guided and this is connected to the main body portion of the die by a narrow web portion.

SUMMARY OF THE INVENTION

One object of the present invention is to obtain a cleaner cut than that obtained by conventional nibbling tools.

Another object is to provide an improved die mounting. Accordingly in one aspect the invention provides a nibbling tool comprising a body, a punch, drive means for reciprocating the punch, a die mounted to the body and having a main body portion defining a channel for guiding the punch for reciprocating a movement, a lower guide portion in which the lower end of the punch is guided and a web portion connecting the main portion and the lower guide portion, the punch and die having co-operating cutting edges, and in which the corners connecting the web portion with the main body portion and/or the lower guide portion are radiused or chamfered.

We have found that the radiused or chamfered corners serve, by percussive movement, to remove any sharp edges or burrs left by the initial cut as the web tracks through the cut. In known nibbling tools the die and punch mounting is unsatisfactory. For example in specification No. 2099744 the die cannot be rotated and the whole tool has to be dismantled to change the die. In the tool of specification No. 1485795 the die is mounted to a separate punch guide sleeve and this leads to inaccuracies in alignment between the die and punch with decreased life of the tool. While Specification 636983 has a die which can be adjusted and removed, in order to change the punch the whole drive, which is packed with grease has to be dismantled. According to a preferred feature the die of this invention is mounted to the body by retaining means which when released allow the die to be rotated about its axis without axial movement or to be removed from and reconnected to the body without opening up the body or disconnecting other parts and releasable connecting means connecting the punch to the drive means such that when the die is removed from the body the punch can be removed from the body through the bore without dismantling the drive means. Preferably the die can be retained in any angular position about its axis of rotation relative to the body. Preferably the die has a circular sectioned shank located as a good sliding fit in a bore in the body, the shank being provided with at least one locating recess into which a retaining member movable in the body can be inserted to locate the die against axial and rotational movement.

According to one feature, the punch has a shaft portion and a head which includes an upward cutting face on its upper surface and which is connected to the shaft portion by a tapered portion, the shaft and head portion both being cylindrical and preferably of the same diameter.

According to another feature a handle is connectable to the upper part of the body coaxial with the punch and die and the upper end of the punch is a sliding fit in a bore in the handle (preferably in a bush) so that the upper end of the punch is guided.

According to another feature the punch is also guided for sliding movement in a lower part of the die (below the cutting plane) so that the punch is guided at each end throughout its stroke in both directions.

According to another feature the punch has a shaft portion and a guide portion of lesser diameter than the shaft portion and connected therewith, the guide portion being eccentrically mounted with respect to the shaft portion so that one axially extending edge thereof is aligned with an edge of the shaft portion.

According to a further feature the drive means comprises coupling means consisting of a punch location block secured to the punch shaft and defining a non circular recess on one side opposite the head of a rotatable drive shaft, and a drive transfer bearing fitted in the recess and lightly compressed or cushioned between the location block and the drive shaft head and having a recess receiving an eccentrically mounted pin on the drive shaft head. This arrangement ensures improved smoothness of action and torque transmission.

BRIEF DESCRIPTION OF THE DRAWINGS

Embodiments of nibbling tool, in accordance with the invention, will now be described by way of example only with reference to the accompanying drawings of which.

Figure 1:
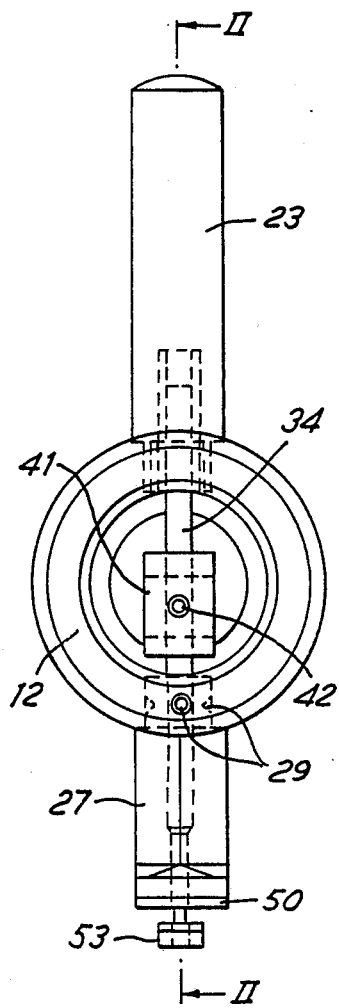
FIG. 1 is an elevational view of a nibbling tool.
Figure 2:
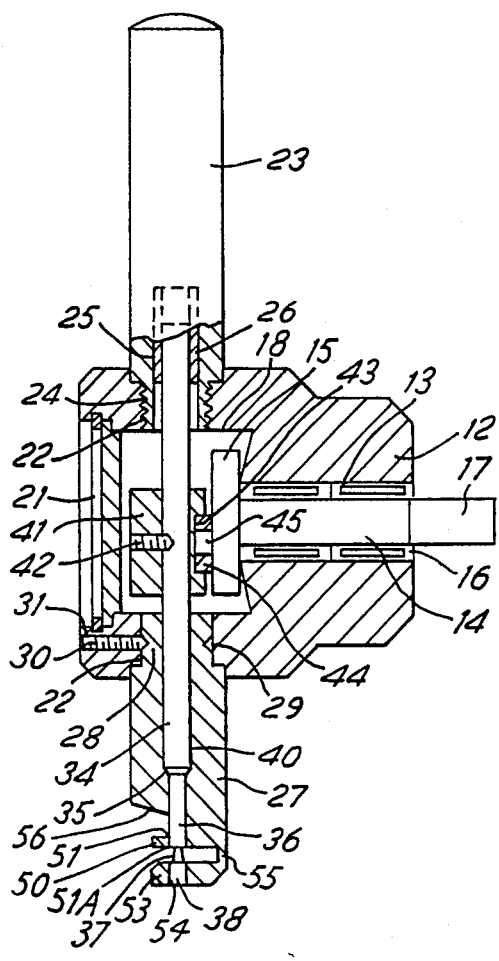
FIG. 2 is a section on the line II—II of FIG. 1.

It should be understood that the invention extends to embodiments in which any feature described with reference to one embodiment is combined (if appropriate) with another embodiment, with obvious modifications if necessary.

The nibbling tool of FIGS. 1 to 4 comprises a body 12 having a first bore 13 in which a rotary shaft 14 having a head 15 is mounted in needle roller bearings 16. The projecting end 17 of the shaft is hexagonal to enable it to be easily gripped by, for example the chuck of a conventional electric drill. The bore 13 opens to a counter bore or recess 18 opening to the other side of the body, which recess is closed by a cover 20 retained by a circlip 21. A cross bore 22 extends through the body and recess 18 at right angles to the bore 13. A handle 23 having a threaded shank 24 is screwed into the upper part of bore 22. The lower end of the handle defines a bore 25 in which is located a bearing bush 26. The handle may be covered with a rubber or plastics material sleeve grip with finger moulds.

A die 27 machined in a single piece from hexagonal bar has a circular sectioned cylindrical shank 28 located as a good sliding fit in the lower part of bore 22. The shank is formed with an annular right angled conical recess 29 and a conical ended screw 30 extending through a threaded bore 31 in the body locates in the recess 29 to restrain the die against rotational and axial movement in the bore 22. Frictional engagement with screw 30 is sufficient to restrain the die against rotary movement. A punch 33 formed in a single piece has an upper shaft portion 34 joined at a shoulder 35 (which limits the downward stroke) to a lower, reduced section, shaft portion 36 connected by a tapered portion 37 to a head 38 having the same diameter as the lower shaft portion 36. The main upper shaft portion 34 of the punch is guided over a substantial part of the punch length (greater than ⅓) in a bore 40 in the die throughout vertical reciprocation. The upper end of the shaft is guided in the bush 26. The punch thus extends substantially the full height of the body and dye and is guided centrally and at its lower end by the die and at its upper end by bush 26. The diameter of parts 36 and 38 is kept to at least 3 mms. preferably 3.5 mm. to give rigidity and strength with the actual cutting section width no more than 3 mm. The tapered portion 37 absorbs the shock impact of the material being cut and pushes it towards the cutting edge. This reduces vibration and allows a higher cutting speed.

Figure 8:
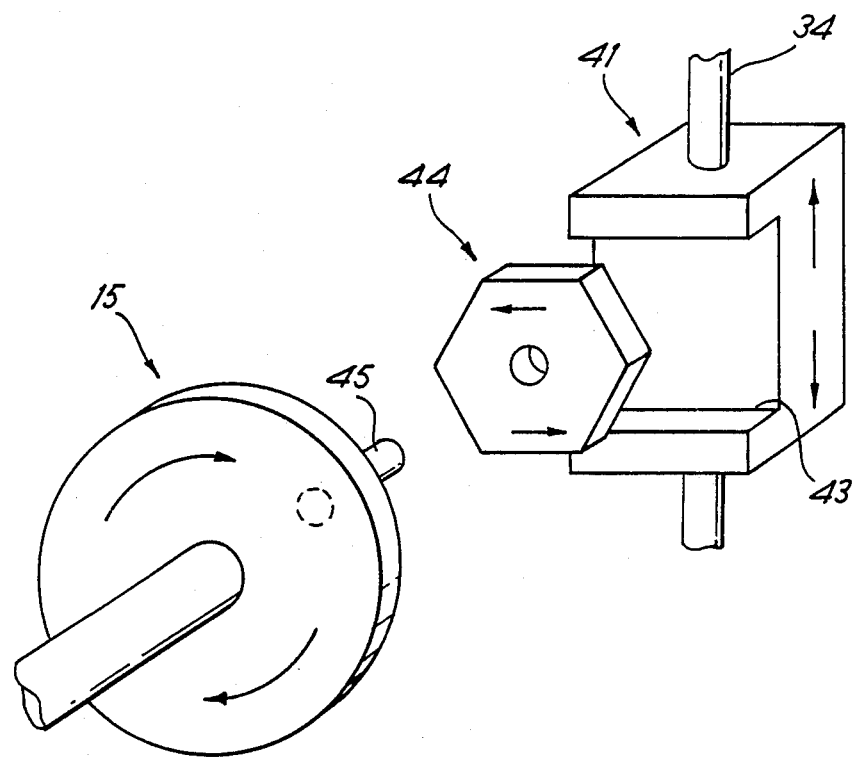
FIG. 8 is a view of the parts forming the drive coupling of the tool, and FIG. 9 parts A, B and C show respectively a side, front and plan view of the die of the FIG. 5 tool.
Figure 9A:
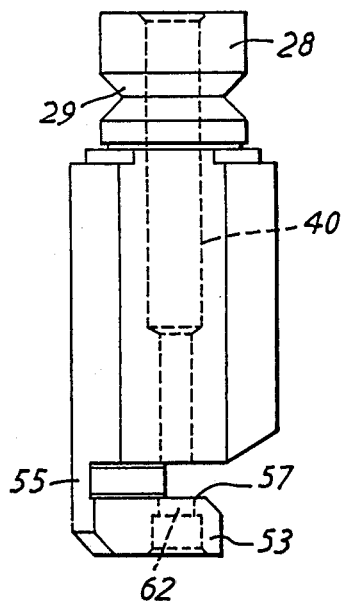
Figure 9B:
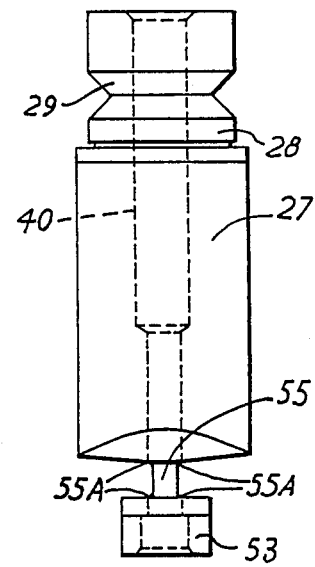
Figure 9C:
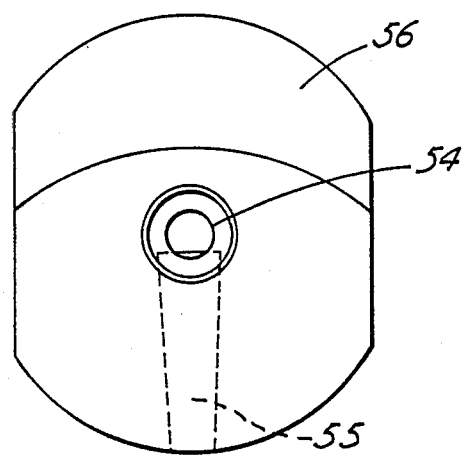

Coupling means (best seen in FIG. 8) for coupling the drive shaft 14 and the punch to convert the rotary movement of the drive shaft to vertical reciprocation of the punch comprise a punch location block 41 secured to the punch by a grub screw 42 and defining a slot recess 43 in its face opposite the shaft head 15. A drive transfer bearing block 44 is slidably located in the recess 43 for horizontal sliding therein and is lightly compressed between the punch location block and the head of the shaft and receives in a recess therein an eccentric driving pin 45 on the shaft head. The bearing block 44 is hexagonal or rectangular sectioned and receives the eccentric pin as a good fit thus providing positive location and support for the bearing. Rotation of the eccentrically mounted pin causes reciprocal vertical movement of the punch and block 41 while the transfer block 44 slides horizontally. Because a considerable area is in contact between the bearing block 44 and the sides of the recess 43, the contact forces are minimised and evenly distributed. This provides a compact, efficient and easily manufactured coupling but other forms of drive and coupling may be used, for example compressed air drive. In addition this tool may have its own motor.

The punch is secured to the drive coupling only by the easily releasable connecting means in the form of grub screws 42, so that when the die or the handle is removed the punch can be withdrawn through the bore 22 without dismantling the drive coupling which is packed in grease.

Figure 3A:
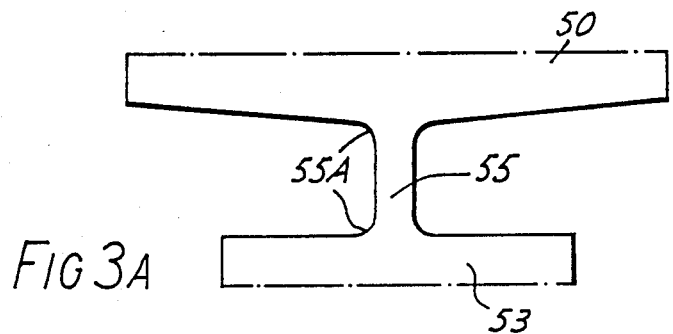
FIG. 3 parts A, B and C are respectively, enlarged views of two alternative forms of die web and an underneath plan view respectively of the die of the tool of FIGS. 1 and 2.
Figure 3B:
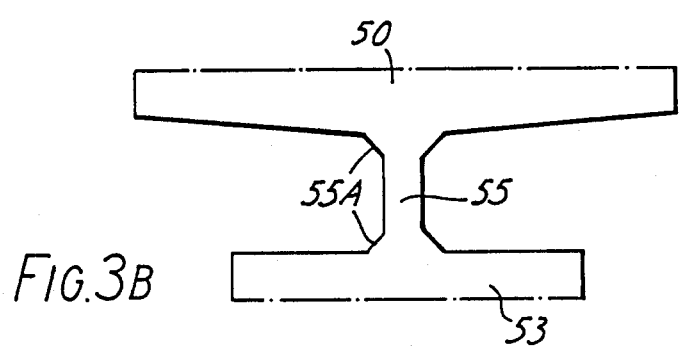
Figure 3C:
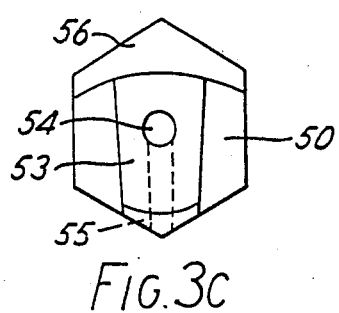

The lower portion of the die is cut away from one side above and below a projecting portion 50 formed with a bore 51 for receiving the punch, the lower edge of this bore defining a curved cutting edge 51A cooperating with a curved cutting edge 52 on the upper surface of the head 38 of the punch. The lower part 53 of the die defines a bore 54 in which the head of the punch is guided for reciprocation during the whole stroke of the punch, this lower part being connected to the main die block by a narrow web 55 which is the same thickness as the punch cutting diameter so that it fits in the cut being formed in material and facilitates material feed. The corners 55A where the web joins the block and head are radiused at 0.38 cms or chamfered, as seen in FIGS. 3A and 3B. The radiused or chamfered corners serve, as the web travels through the cut, to remove sharp edges or burrs by vibrating against them. For example the web thickness may vary between 0.292 cms and 0.200 cms. The scalloped Section 56 nearest to the shank which is profiled out to the inside edge of the internal bore is provided to allow for the clearance of swarf, dirt etc. after the upward cutting stroke of the punch.

By providing good guiding of the punch, the parts defining the cutting edges are sufficiently rigid and stable that a small gap between the cutting edges can be obtained, in this example 0.0127 cms., thus keeping burr to a minimum, and this burr is removed by the radiused or chamfered corners of this web.

The mounting of the punch and die allows adjustment of the cutting direction throughout the 360° range and easy replacement of the die without removing any other parts and easy replacement of the punch by removing the die and disengaging screw 42.

The tool may be used to cut on the downward stroke (or on both the upward and downward strokes) by using the cutting edges 57 and 58.

Figure 4B:
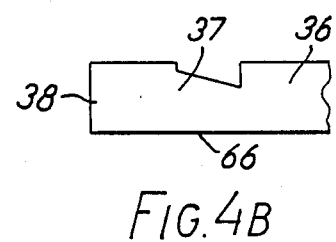
FIG. 4B shows a modified form of part of the punch of FIG. 4A.
Figure 4A:
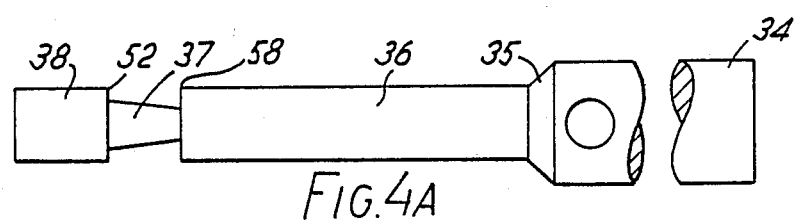
FIG. 4A is a side view of the punch of the tool on an enlarged scale.
Figure 5:
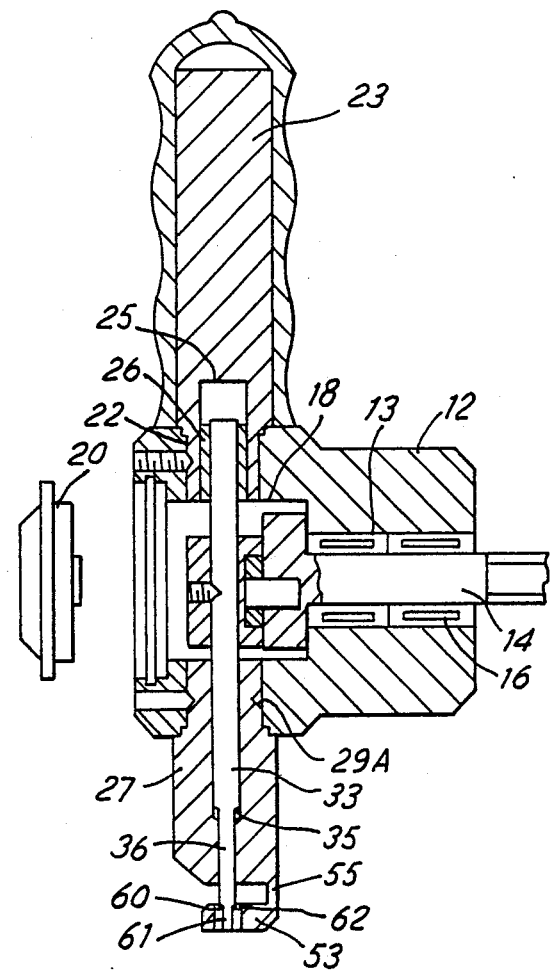
FIG. 5 is a view similar to FIG. 2 showing an alternative form of tool, FIG. 6 parts A and B show an enlarged side and end view of the punch of the FIG. 5 tool, FIG. 7 parts A and B are side and front views of a nibbling tool coupled to a drive means.

FIG. 5 shows a modified tool having a punch intended to cut on the down stroke only. The tool is similar to that of FIGS. 1–5 and like parts have been given the same reference numerals. The lower shaft portion 36 of the punch is joined by a shoulder 60 to a lower guide portion 61 which is guided in a bore 62 in the lower die part 53.

Figure 6A:
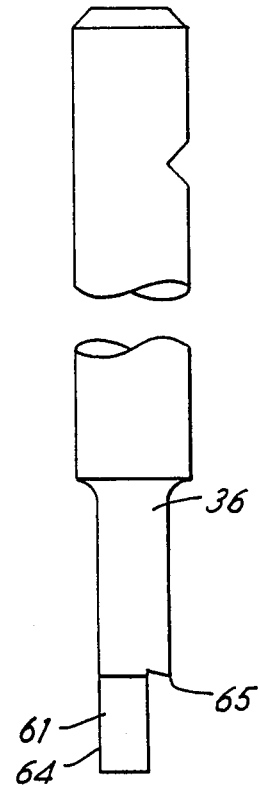
Figure 6B:
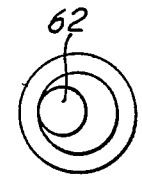

In a modification shown in FIG. 6 the lower guide part 61 is eccentrically mounted compared with the axis of the punch so that its back edge 64 is aligned with the corresponding edge of the shaft part 36 to give better guiding. The cutting edge is shown at 65. A similar modification to the punch of FIGS. 1–4 is shown in FIG. 4B where the tapered portion 37 is eccentrically mounted to give a continuous back edge 66 acting as a further guide.

Figure 7A:
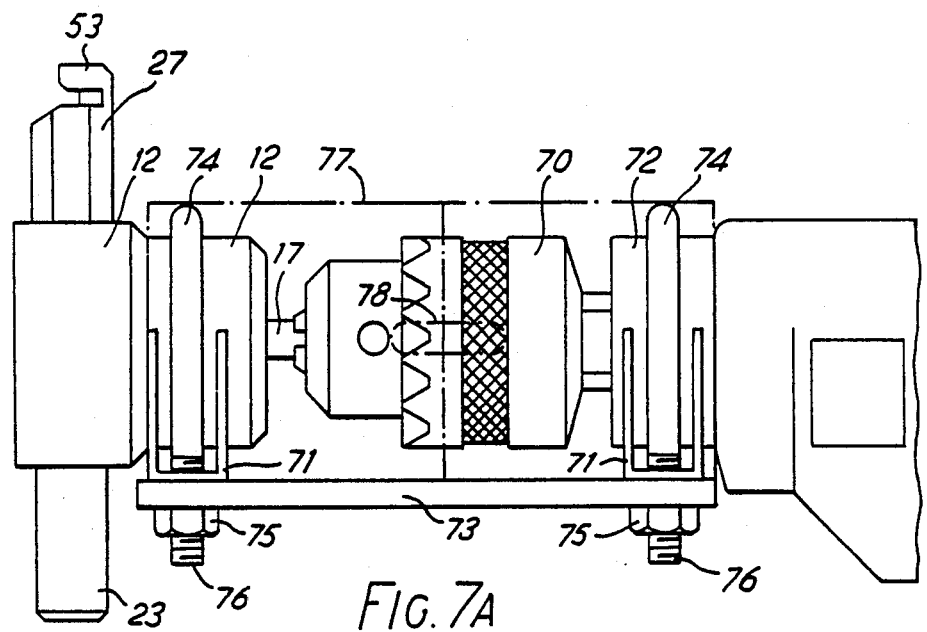
Figure 7B:
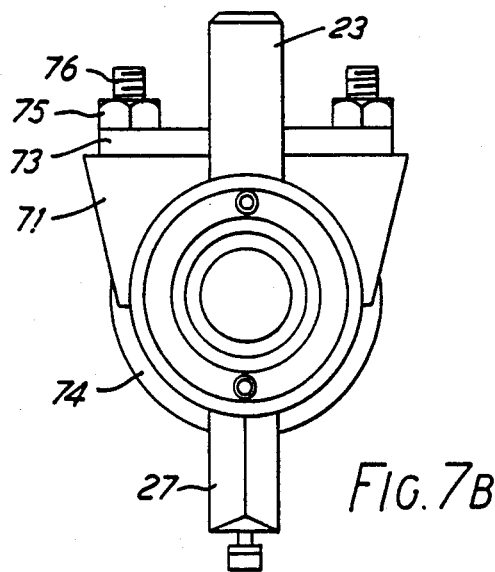

Conventionally where the drive has been taken from a power drill or the like the nibbling tool has been held by the user on to the drill while in use. FIGS. 7A and 7B show a means for mounting the nibbling tool to an external drive such as a drill so that it need not be manually held during use. A drill head 70 is shown engaged with the projecting end 17 of the shaft 14 of the nibbling tool. A pair of clamp supports 71 having arcuate surfaces dimensioned to engage round the body 12 of the tool and a similar body portion 72 of the drill engage a base plate 73. A pair of U-bar clamps 74 extend over the other sides of the body portions 12 and 72 through bores in the clamp supports 71 and baseplate 73 and are secured thereto by nuts 75 engaging their threaded ends 76. A guard 77 may be provided mounted by flanges on the baseplate. This guard is split into two halves to facilitate fitting of the motor drive to the nibbling tool and the halves are secured together via a slot 78 allowing use of a screwed fastener. The drill with nibbling tool may be mounted on a work bench or the like, leaving both the operator's hands free to guide the sheet being cut.

What is claimed is:

1. A nibbling tool for cutting a slot in sheet material by relative movement between the tool and the material in the direction of the slot comprising a body, a punch, drive means for reciprocating the punch, a die mounted to the body and having a main body portion defining a channel for guiding the punch for reciprocating movement, a lower guide portion in which the lower end of the punch is received and a web portion connecting the main portion and the lower guide portion, the punch and die having co-operating curved cutting edges extending transversely of said direction of relative movement such that each reciprocating movement removes a crescent shaped chip of material, the web portion having a width substantially corresponding to the transverse width of the cutting edges in a direction normal to a line passing through the center of the punch and web portion, and in which the edges formed at the connection between the web portion with the main body portion and/or the lower guide portion in a direction parallel to the line passing through the center of the punch and web portion are radiused or chamfered, whereby the edges of the cut sheet material is free to vibrate against the radius or chamfered portions of the web to remove sharp edges left by the initial nibbling of the punch and die as the web tracks through the slot cut in the sheet material.

2. A nibbling tool according to claim 1 in which the die is mounted to the body by retaining means which when released allow the die to be rotated about its axis without axial movement or to be removed from and re-connected to the body without opening up the body or disconnecting other parts.

3. The nibbling tool of claim 1 wherein the punch is an elongate member and the drive means engages an intermediate portion of the punch, with punch guide means for guiding both ends of the elongate member, the guide means being located on both sides of the intermediate portion of the punch engaged by the drive means.

4. A tool according to claim 3 in which the shank die includes a circular which defines at least one locating recess into which a retaining means which is movably mounted in the body can be inserted to locate the die against axial and rotational movement.

5. A tool according to claim 4 in which the shank defines a single annular recess.

6. A tool according to claim 3 in which the punch has a shaft portion and a head portion connected to the shaft portion by a connecting portion, and in which the connecting portion is tapered.

7. A tool according to claim 3 in which the punch has a shaft portion and a head portion connected to the shaft portion by a connecting guide portion of lesser diameter than the shaft portion and head portion, the guide portion being eccentrically mounted with respect to the shaft portion so that a first axially extending edge thereof, remote from the cutting edge, is aligned with an edge of the shaft portion, and a second axially extending edge adjacent the cutting edge is tapered, the die having a main body portion defining the channel for guiding the punch connected by a narrow web portion to a lower guide portion defining a channel for receiving and guiding the punch head and said first axially extending edge.

8. A tool according to claim 1, claim 3 or claim wherein the drive means is designed to be held to and powered by an external power means having a body portion separate from the tool body, and including releasable clamp connecting means for clamping the tool body to such a body portion.

9. A tool according to claim 1 or claim 3 in which the gap between the shearing faces of the die and punch is no more than one thousandth of an inch.

10. A tool according to claim 1 or claim 3 in which the punch is formed in a single piece and extends for substantially the full height of the body and die and including further guide means arranged to receive and guide the upper end of the punch throughout its reciprocating movement.

11. The nibbling tool of claim 1, wherein the die is formed in a single piece detachably mounted to the body by retaining means and in which the punch is formed in a single piece and extends for substantially the full height of the body and die and including further guide means on the opposite side of the drive means from the cutting edges and arranged to receive and guide an upper end of the punch throughout its reciprocating movement.

12. A nibbling tool comprising a body, a punch having an elongate member formed in a single piece having a longitudinal axis, drive means for reciprocating the punch parallel to its axis, a die co-axial with the punch defining a channel for guiding the punch over a substantial part of the length of the punch throughout its reciprocating movement, the punch and die having co-operating cutting edges, the die being formed in a single piece having a circular sectioned shank located as a good sliding fit in a coaxial bore defined in the body and retaining means retaining the die in the body such that when the retaining means is released the die can be rotated about said axis without axial movement and can be removed from and re-connected to the body without opening up the body or disconnecting other parts, and releasable connecting means connecting the punch to the drive means such that when the die is removed from the body the punch can be removed from the body through the bore without dismantling the drive means, the punch having an elongated shaft portion and a head portion connected to the shaft portion by a connecting portion, and in which the connecting portion is tapered along the length of the connecting portion from the shank portion to the head portion and the connecting portion is eccentrically mounted so that its edge remote from the cutting edge is aligned with a longitudinal edge of the shaft portion.

13. A tool according to claim 12 which can cut on the upstroke, the downstroke or both strokes.

* * * * *